United States Patent Office

3,679,443
Patented July 25, 1972

3,679,443
MINERAL WOOL MADE FROM SILICATE GLASS COMPRISING IRON OXIDES
Fridolin Mechel, Ludwigshafen-Edigheim, and Hans Kummermehr, Ludwigshafen (Rhine), Germany, assignors to Grunzweig & Hartmann Aktiengesellschaft, Ludwigshafen (Rhine), Germany
No Drawing. Filed Dec. 17, 1969, Ser. No. 885,983
Claims priority, application Germany, Dec. 18, 1968,
P 18 15 244.8
Int. Cl. C03c *13/00*
U.S. Cl. 106—50        4 Claims

---

ABSTRACT OF THE DISCLOSURE

Temperature and acid resistant mineral wool, fibers, filaments and the like comprising the glass forming oxides $SiO_2$ and $Al_2O_3$, meltable iron oxides in an amount of at least 18 wt. percent and from 0 to 5 wt. percent of alkali metal and/or alkaline earth metal oxides.

---

This invention relates to temperature and acid resistant mineral wools, mineral fibers, continuous mineral filaments, threads and the like prepared from glass forming oxides or minerals and in particular from natural clays and a process for preparing such mineral fiber products.

Mineral wools, mineral fibers and the like having various different compositions are already known. The known fibers are generally resistant to temperatures of from 500 to 600° C. The boundaries of the temperatures to which the fibers are exposed in use also come within this range. The main components of the mineral fiber products are $SiO_2$ and $Al_2O_3$. These components have high melting points so that most manufacturing processes require that fluxing agents be added to the glass forming components in order to lower the melting temperature of the mixture. The viscosity of the melt is however entirely dependent on the temperature with the result that fibers, wool, continuous filaments, threads and the like cannot be made from the melt using the known drawing or blowing processes.

As fluxing agents, there have heretofore been used the alkali metal oxides and alkaline earth metal oxides. These fluxing agents in general give rise to an objectionable fluid content in the melt which in turn more or less disadvantageously effects the acid resistance of the mineral fiber products manufactured therefrom. It has therefore already been proposed to replace a part of the alkali metal and/or alkaline earth metal oxides with iron oxide. The amounts of alkali metal and alkaline earth metal oxide as heretofore used have amounted to above 5 weight percent and the iron oxide has been used up until the present invention in an amount of at the most 15 weight percent. Thus, the iron oxide's contribution as fluxing agent has only been of a supporting or secondary nature. In working up the known iron oxide containing mixtures, the difficulty has arisen that the iron oxide has acted to increase the crystallization tendency of the melt and therewith, the melt's behavior has been disadvantageously influenced. The utilization of alkali metal and/or alkaline earth metal oxide as fluxing agent however lowers the utilization range of temperatures of the fiber products and also lowers the acid resistance.

There has existed a strong need for mineral fibers, mineral wools and the like which products are temperature and acid resistant and in whose manufacture no disturbances, as for instance, recrystallization of the melt are encountered.

In accordance with the invention, there are now provided temperature and acid resistant mineral wools, mineral fibers and the like on the basis of conventional glass forming oxides or minerals and preferably on the basis of natural clays comprising in addition to $SiO_2$ and $Al_2O_3$ in the usual amounts and ratios, a high content of meltable iron oxides and at the most 5 weight percent based on the weight of the total anhydrous mixture of alkali metal and/or alkaline earth metal oxides. In the use of alkali metal and/or alkaline earth metal oxides as fluxing agent in these decreased amounts, in a most surprising manner the disadvantages above noted with respect to the fluid condition of the melt are eliminated if the amount of iron oxide is increased to an adequate level amounting to at least 18 weight percent calculated on the basis of the total anhydrous mixture.

It has proved advantageous that the iron oxide as present in the starting mixture be predominantly in the form of $Fe_2O_3$ and FeO, wherein if $Fe_3O_4$ is present, it is only present in very small amounts, i.e., under about 5%. The weight ratio of $Fe_2O_3$ to FeO has a value greater than 5:1 whereby an especially satisfactory range of ratios amounts to between about 15:1 and 25:1.

The mineral wools, fibers etc. of the invention are manufactured by drawing or blowing of the melt whose starting mixture has been suitably so formulated as to have a high content of iron oxides i.e., of over 18 weight percent and most preferably of between 20 and 35 weight percent, 15 to 65 weight percent $SiO_2$ and from 33 to 12 weight percent $Al_2O_3$. In addition to these main components, there can be present, the conventional additives such as $TiO_2$ and $MnO_2$ and the like in small concentrations, i.e., under about 3 weight percent. The fields of application and quality of the final products can often be advantageously influenced by addition of alkali metal and/or alkaline earth metal oxides in an amount of at the most 5 weight percent of the total mixture.

The presence of the oxides $TiO_2$ and $MnO_2$ does not interfere with the temperature resistance and the acid resistance of the fibers manufactured in accordance with the invention. Really, the oxide $MnO_2$ can be added to a rather high amount, about up to 8 weight percent to the melt. Up to 3 weight percent the above mentioned qualities are improved to a small amount.

The starting mixtures for the manufacture of the mineral fiber products having the aforesaid composition are prepared by admixing the named oxides in the indicated amounts. There can also be used in the formulation of the dry mixes, mineral products having the same final composition or clays having the same composition in total, in each case with or without the addition of any fluxing agents.

The following is an example of a mixture suitable for use as a starting material in accordance with the invention:

| | Percent |
|---|---|
| $SiO_2$ | 45 |
| $AlO_3$ | 15 |
| $Fe_2O_3$ | 25 |
| FeO | 1 |
| CaO and MgO | 2.5 |
| $K_2O$ and $Na_2O$ | 2.5 |
| $TiO_2$ | 1 |
| Loss on ignition and trace elements | 8 |

This mixture has a most satisfactory melt behavior when the low amounts of alkali metal oxide and/or alkaline earth metal oxides in accordance with the invention are used and the melt shows substantially no crystallization tendency. The viscosity of the melt permits the use of the mixture satisfactorily for manufacturing fiber products by all of the conventional procedures.

The glass forming raw material can be introduced in any form into the melt, provided the final composition according to the invention is maintained and the components containing the $SiO_2$ are finely dispersed.

The latter statement is a condition not necessary to the invention but it is advantageous in order to achieve low melting temperatures. For example, the batch for the production of the wool according to the invention can be composed from oxides, carbonates with the oxides being formed therefrom in the heating process of the melt, from natural minerals such as clay, especially clays containing nontronite $[Fe_2(OH)_2(Si_4O_{10}) \cdot nH_2O]$ and clays which can be derived from illite with the contents of potassium and magnesium reduced. Further possible forms of the raw materials are basalts, slags and the by-product of the production of aluminum which is known to have high contents of ferric oxides and silicium oxide.

In a preferred realization of the invention the glass forming bath is a clay with the appropriate composition. The analysis given above is an example of such a clay.

Such clays very often are found above or below refractory clays. They are virtually useless for other productions because of the high iron content.

The clay characterized by the analysis given above can be fused at a temperature of about 1500° C., the temperature in the forehearth may be in the range of 1420° C. to 1490° C. The melt may then be subdivided in the outflow by platinum bushings and the fibers may be drawn in the known manner between steam or compressed air nozzles. These steps of the process of preparing the mineral wool or fibers according to the invention in themselves are well known and are not the subject of the invention.

The fibers according to the invention prepared by a process of drawing as given in the above example of performance have diameters in the range between 2 and about 12 microns depending on the temperatures of the melt and the pressure of the medium in the drawing nozzle.

The mineral wool according to this invention, when compared to other commercially available mineral wools has a temperature resistance up to 1000° C., is acid resistant against HCl and $H_2SO_4$, has a higher elasticity and, due to the favorable viscosity vs. temperature characteristics of the melt, has fine fibers and little shot.

The compositions of the invention, in the form of their melts can also be satisfactorily worked by any of the known nozzle drawing processes and by the known blowing processes to form mineral wools. These mineral wools can be readily distinguished from the mineral wool products prepared on the basis of the previously known compositions by the formers increased resistance to temperature and acids. It has been established by testing that the increase of the applicable temperature limits for mineral fibers based on the compositions of the invention is from 200 to 300° C. higher than the known compositions which contain in excess of 5 weight percent of alkali metal and/or alkaline earth metal oxide as fluxing agent. The increase in usable temperature for the compositions of the invention as compared to E-glass amounts to over 400° C.

In order to establish the resistance to acid, 1 gram amounts of mineral wool having the composition as above set out were placed in 50 ml. of 0.1 NHCl and refluxed for 5 minutes. The refluxed mixture was thereafter titrated with NaOH. In these tests, the mineral wool prepared on the basis of the known compositions and containing the conventional amounts of alkali metal and/or alkaline earth metal oxides as fluxing agent consumed between 15 and 40 ml. HCl. Mineral wool prepared from the above set out composition when subjected to the same procedure consumed an amount of HCl which was below the measurable limits. The consumation of HCl is a measure of the dissolution of the wool by the acid.

As noted before, the compositions of the invention can be used to form mineral wools, mineral fibers, mineral filaments, threads and the like using the known drawing processes, as for instance nozzle blowing, centrifugal casting, nozzle drawing and the like.

Through the use of the novel compositions of the invention, not only are new and valuable properties imparted to the mineral wool such as, increased temperature and acid resistance, but the actual processing of the compositions to the end products is improved. The improvement in the manufacturing process stems from the fact that in a glass forming mixture having a high content of iron oxides from which the conventional alkali metal and/or alkaline earth metal oxide fluxing agents have been partially or entirely removed, being present at the most, in an amount of 5 weight percent, the known crystallization disturbances in the melt are substantially eliminated. The flux content of the melt obtained through additions of iron oxide, preferably in amounts of 20 to 30 weight percent based on the anhydrous mixture resulting in optimal working conditions in drawing or blowing of the melt and permitting an especially high yield of fine, homogeneous fibers not heretofore possible.

In accordance with the invention, the $Fe_2O_3$ content of the conventional compositions (which contain up to 15% $Fe_2O_3$) can be increased to levels within the range of the invention, this increase amounting in the case where the conventional composition contains the maximum of 15 weight percent to from 3 up to 20%.

According to the invention, the iron oxide addition can be regulated so that the melt's temperature, viscosity, crystallization tendency, temperature resistance can be steered in the desired direction. For instance, in a starting material with about 15 weight percent of alkali metal and/or alkaline earth metal oxide as flux, the amount of $Fe_2O_3$ required to be added amounts at the least to 20 weight percent and preferably 25 to 30 weight percent. In this manner, the amount of alkali metal and/or alkaline earth metal oxide is automatically decreased to under 5 weight percent. The suitable amount of $Fe_2O_3$ to be added as flux can in the case where any doubt exists be determined by routine experiments using crucible melt tests. The necessary amounts of iron oxide as determined by these tests can then be introduced into the mixtures.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Temperature and acid resistant mineral wool fibers, filaments and the like consisting essentially of 20 to 35 wt. percent iron oxide and wherein the ratio of $Fe_2O_3:FeO$ is above 5:1, 15 to 65 wt. percent $SiO_2$ and 15 to 25 wt. percent $Al_2O_3$, 0 to 5 wt. percent calculated on the weight of the total anhydrous mixture of at least one alkali metal oxide and alkaline earth metal oxide and 0 to 3 wt. percent calculated on the weight of the total anhydrous mixture of at least one of $TiO_2$ and $MnO_2$, wherein said mineral wool, fibers, filaments and the like are resistant to temperatures up to 1000° C.

2. Temperature and acid resistant mineral wool, fibers, filaments and the like according to claim 1 prepared by drawing a melt consisting essentially of:

| | Percent |
|---|---|
| $SiO_2$ | 45 |
| $Al_2O_3$ | 15 |
| $Fe_2O_3$ | 25 |
| FeO | 1 |
| CaO and MgO | 2.5 |
| $K_2O$ and $Na_2O$ | 2.5 |
| $TiO_2$ | 1.0 |
| Loss on ignition and trace elements | 8.0 |

3. Temperature and acid resistant mineral wool, fibers, filaments and the like according to claim 1 wherein said $SiO_2$ is present in an amount of 30 to 45 wt. percent.

4. Temperature and acid resistant mineral wool, fibers, filaments and the like according to claim 1, wherein said iron oxide comprises a mixture consisting essentially of $Fe_2O_3$ and FeO and the ratio of the $Fe_2O_3:FeO$ is in the range of about 15:1 to 25:1.

References Cited

UNITED STATES PATENTS

| 3,310,412 | 3/1967 | Hofstadt et al. | 106—50 |
| 3,007,806 | 11/1961 | Hartwig | 106—50 |

FOREIGN PATENTS

| 765,244 | 1957 | Great Britain | 106—50 |

OTHER REFERENCES

Snow et al.—J. Am. Cer. Soc. 25 (1942), p. 158 of Article on pp. 151–160, "Equilibrium Studies in the System FeO—$Al_2O_3$—$SiO_2$."

Muan, J. Am. Cer. Soc. 40 (1957), pp. 121–133, "Phase Equilibria of Liquidus, Temperatures in the System Iron Oxide—$Al_2O_3$—$SiO_2$ in Air Atmosphere."

TOBIAS E. LEVOW, Primary Examiner

W. R. SATTERFIELD, Assistant Examiner

U.S. Cl. X.R.

65—2; 106—52